United States Patent [19]

Lundin

[11] 4,027,738
[45] June 7, 1977

[54] DEVICE FOR CO-ORDINATED DRIVING OF A TOWING VEHICLE AND A TOWED VEHICLE

[75] Inventor: Lars Olof Lundin, Karlskoga, Sweden

[73] Assignee: AB Bofors, Bofors, Sweden

[22] Filed: Dec. 8, 1975

[21] Appl. No.: 638,257

[30] Foreign Application Priority Data

Dec. 18, 1974 Sweden .............................. 7415880

[52] U.S. Cl. ........................... 180/14 A; 180/66 R; 60/420; 60/431; 60/445
[51] Int. Cl.² ........................................ B62D 59/04
[58] Field of Search ............ 60/420, 423, 426, 427, 60/431, 435, 444, 449, 451, 486, 445; 180/14 A, 14 R, 44 F, 66 R

[56] References Cited

UNITED STATES PATENTS

| | | | |
|---|---|---|---|
| 3,247,919 | 4/1966 | Moon | 60/426 X |
| 3,695,373 | 10/1972 | Bostrom | 180/14 A |
| 3,736,732 | 6/1973 | Jennings et al. | 180/44 F X |
| 3,788,063 | 1/1974 | Kempson et al. | 60/431 X |
| 3,817,341 | 6/1974 | Greene | 180/14 D |

*Primary Examiner*—Edgar W. Geoghegan
*Attorney, Agent, or Firm*—Pollock, Vande Sande & Priddy

[57] ABSTRACT

The present invention relates to an apparatus providing for the co-ordinated driving of a towing vehicle and a towed vehicle equipped with a hydrostatic driving system of its own. The respective driving wheels of the towed vehicle are each driven by a separate hydrostatic transmission and a variable output hydraulic pump coupled to a hydraulic motor which can be driven by output of said hydraulic pump and can be engaged with a driving wheel. The apparatus includes for each respective transmission control circuits having a control device mounted on the towing vehicle. The invention is particularly useful for a cross-country towing vehicle and a towed vehicle in the form of a heavy field artillery gun which for purposes of operating the hydrostatic transmissions is equipped with a reciprocating engine, for instance a gasoline engine, which actuates said transmissions via a dividing gear box.

32 Claims, 14 Drawing Figures

DEVICE FOR CO-ORDINATED DRIVING OF A TOWING VEHICLE AND A TOWED VEHICLE

BACKGROUND OF THE INVENTION

It has been proven that cross-country mobility increases considerably with co-ordinated driving, which for artillery provides special advantages, particularly from a tactical miliary point of view. In order to achieve co-ordinated driving in cases such as these, it has previously been proposed to man not only the tractor but also the field artillery gun. This, however, requires a special co-ordinated driving technique on the part of the drivers and also creates a need for additional drivers, neither of which is desirable.

It has also previously been proposed to provide the two vehicles with special synchronizing devices which adapt the speed of the towed vehicle to the speed of the towing vehicle. This is done by sensing the speed of the wheels of the respective vehicles. The excess speed of the faster vehicle vehicle is then reduced. In addition to the fact that such synchronizing devices have a complex design, it has been proven that they do not function effectively in the type of terrain involved in the present case.

OBJECTS AND SUMMARY OF THE INVENTION

The purpose of the present invention is to create a device which solves all of the problems envisaged. The feature that can be considered to be characteristic of the device according to the invention is that the control circuits for the respective driving wheels comprise a control circuit which actuates a variable displacement hydraulic pump and which independent of the speed of the driving wheel ensures that the driving torque for the driving wheel obtained from the hydraulic motor assumes a value which is constant and corresponds to a value set on the control device. In this way, in each driving case, the load on the respective driving wheel will determine a working pressure whidh is sensed and maintained constant through control of the flow from the pump.

The equipment for co-ordinated driving is then appropriately designed so that a reduction of the adjusted driving torque takes place automatically if the reciprocating engine, due to overloading or the like, has its speed reduced below a predetermined value. Moreover, the driving wheels are provided with free wheeling devices which start to function if the towing vehicle gives the towed vehicle a speed exceeding a predetermined value.

In a further specific development of the concept of the invention, in the respective hydrostatic transmission, the pump is of the kind which is provided with control pistons arranged so that they can be actuated by a primary control pressure and by return springs, which in case of a decreasing or disappearing primary control pressure strive to move the thrust plate of the pump towards its zero displacement position. The new device can also be used to advantage in hydrostatic transmissions of the kind where the respective pump can operate with a built-in electrically controlled servo valve, and where the main pump is not self-priming and is provided with a feed pump belonging to it.

Said field artillery piece (field howitzer) can be of the kind which is described in the Swedish patent specification No. 7300600-9 and which is comprised of two driving wheels and two so-called pivot wheels, the driving wheels being applied on oposite sides of the chassis frame.

BRIEF DESCRIPTION OF THE DRAWINGS

Embodiments proposed at present which have the characteristics significant of the invention will be described in the following, with reference to the accompanying drawings, in which:

In FIG. 1, an internal combustion engine 1 is connected via a dividing gear box not shown in the figure, to a variable displacement hydraulic pump 2 in a hydrostatic transmission for one of the driving wheels. Pump 2 is assumed to be connected to a hydraulic motor, not shown, via hydraulic pipes 3 and 4. The pressure in the pump system is kept at a constant value predetermined by a control device 5. A setting device or servo motor 6 piston 7 actuates the pilot lever 8 of pump 2 in having a comparison of the working pressure differential in pipes 3 and accordance with and a control pressure differentiated set by control device 5. For generating the control pressure differential, the control circuit includes an electrohydraulic converter 9 and a combined flow and pressure amplifier 10, by which it is possible to generate a control pressure differential of the size desired. The electrohydraulic converter 9, as well as the combined flow and pressure amplifier 10, are connected to a low pressure system of hydraulic oil via pipes 11 and 12. The converter 9 is also connected to the control device 5, which in the case shown has the form of a potentiometer, via an electric circuit 13. Electric circuit 13 is connected to a power source via its connection 14, as well as to a speed sensor 15 on the gasoline engine 1. The electric circuit 13 which, will be described in more detail with regard to FIG. 6 is made in such a way that the control pressure that has been set by the control device 5 will be reduced if the speed of engine 1, for instance due to overload, should be reduced. The control device 5 is located on the towing vehicle 16. The reciprocating engine 1 is also provided with a speed regulator 1a. The towed vehicle which, in the present case, is assumed to consist of a field artillery piece (field howitzer) has two driving wheels and two so-called pivot wheels. The driving wheels 17 and 18 shown in FIG. 2 are applied on opposite sides of the chassis frame. Driving wheels 17 (= left wheel) and 18 (= right wheel) can be driven by means of a hydraulic unit of conventional design which comprises a variable displacement axial piston pump for each driving wheel, with an associated feed pump a fixed displacement axial piston motor, for each driving wheel and the necessary valve functions.

Figure 2:
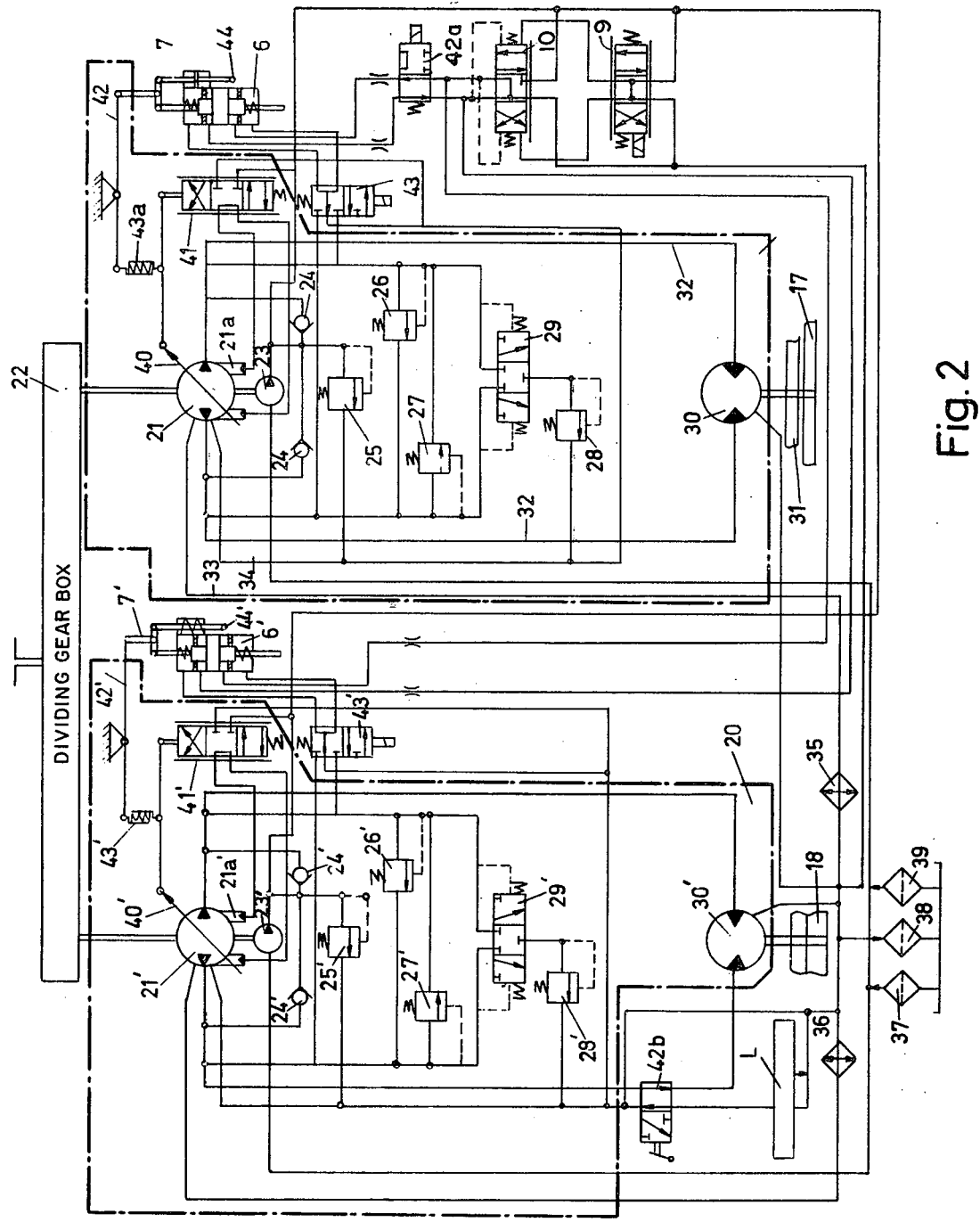
FIG. 2 in the form of a skeleton diagram shows the parts comprised in the design according to FIG. 1 in more detail.

These hydraulic units 19 and 20 are framed within dot-dash lines in FIG. 2, 19 referring to equipment for the left driving wheel 17 and 20 the equipment for right driving wheel 18. As the designs of hydraulic units 19 and 20 are identical, unit 19 will be described briefly. The corresponding elements in unit 20 have been given the same reference designations as the elements of unit 19, but supplemented with prime signs.

The pump 21 for the left driving wheel is driven from an output shaft of the dividing gear box 22. The feed pump 23 for pump 21 is provided along with non-return valves 24. The low pressure system also includes an overflow valve 25, which operates when pressure plate of the pump is not deflected so that its displacement in volume per revolution is zero; while the high pressure system has two overflow valves 26 and 27, one for each direction of fluid flow corresponding to the directions of vehicle movement, forward and reverse. There is also a further overflow valve 28 for the low pressure system, and a flushing valve 29 which connects the intake side of the pump to overflow valve 28 so that the system will continuously be flushed with cooling oil. The hydraulic motor 30 for left driving wheel 17 is connected to the wheel via a clutch 31, which will be described with regard to FIG. 5. In addition to the pipes 32 between hydraulic pump 21 and the hydraulic motor 30, there is a first drain pipe 33 and a second drain pipe 34. The system also contains two coolers 35 and 36, for cooling of the return flow, a suction filter 37 and two return filters 38 and 39. The return filters are connected in parallel in order to give little drop of pressure. The drain pipes from the motor go direct to the filters, and it is thus only the oil from the pumps which is cooled. The flushing oil from the respective valves is conveyed into the pump housings. The pump flow obtained from the pumps 21 is varied by means of the pilot lever 42 of the pump, which is connected to a pump servo valve 41 belonging to the pump.

During auxiliary driving from the towed vehicle, in accordance with the above, the power delivered to wheel 17 and 18 (the torque) is to be controlled with the aid of the equipment for co-ordinated driving which comprises the units 6, 9 and 10. The power generating equipment shown is also to be used for other functions of the artillery piece, for instance for loading and firing, which functions are symbolized by "L" in FIG. 2. However, the present invention is not concerned with these functions, which alternatively can be controlled through special valves 42a, 43, 43' and 42b.

The equipment for coordinated driving regulates the system pressure desired and, accordingly, the torque desired and power to be delivered to a respective driving wheel, depending on the value set on a potentiometer 5 in the towing vehicle 16. The potentiometer 5 gives a current to the converter 9 which, in turn responds with a pressure differential output which is proportional to the current. In the combined flow and pressure amplifier 10 the flow capacity is amplified to supply the oil required to the setting device 6. The pressure differential from convertor 9 produces another differential pressure output from the combined flow and pressure amplifier 10. The pressure differential from the combined flow and pressure amplifier 10 then constitutes the target value for the desired system pressure differential. In the respective setting devices 6, 6' the forces arising from the target value pressure differential and the actuator working pressure differential are compared. The power difference via a spring, achieves a change in position of the piston 7, 7' of the setting device. This change of position causes an actuation of the setting of the servo valve 41, 41', which in turn, gives a pilot flow corresponding to the changed setting to the control pistons 21a, 21a' of the pump. In this way, a deflection of the return levers 40, 40' of the pump is achieved so that the valves 41, 41' are reset, which involves the throttling of the pilot flow. Thus, the pumps will be deflected to the new positions of the setting devices with corresponding new displacements. The pressure then created by the pumps serves to reset the setting devices to the target value. The plunger of the setting device actuates the servo valve of the pump via the pilot lever 42 and a spring 43a. The setting device has a zero position which makes it possible for the device to function local override or control member 44 which is used during so-called self-propulsion of the towed vehicle. As will be noted from the above, each hydrostatic transmission is provided with its setting device 6 and 6', respectively, while the units 9, 10 and 42a are common for both transmissions.

Figure 3:
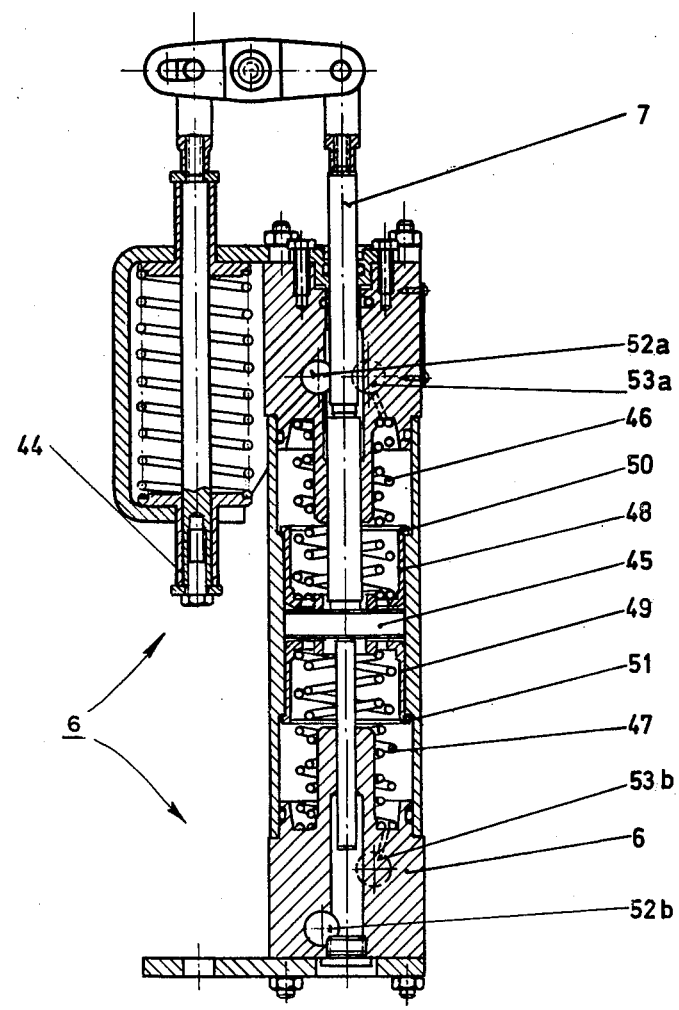
FIG. 3 in a vertical view and in cross-section shows the design of a setting device included in FIG. 2.

FIG. 3 shows an example of a servo-motor or setting device 6 which can be used and which is known in itself. The setting device is made with a built-in zero position, which permits said functioning together with the control member 44 for the self-propulsion of the towed vehicle. The piston 45 in the setting device is a double-action piston, and the zero position is established by means of springs 46 and 47 set on both sides of the piston and cup-formed inner pistons 48 and 49 with protruding flanges 59 and 51 which, respectively, can coact with holding surfaces arranged in the inner wall of the setting device. The input openings for the working pressure are shown at 52a and 52b, while the input openings for the control pressure are shown at 53a and 53b. When no control pressure differential exists at ports 53a and 53b, control member 44 may be used to control self propulsion of the towed vehicle.

Figure 4:
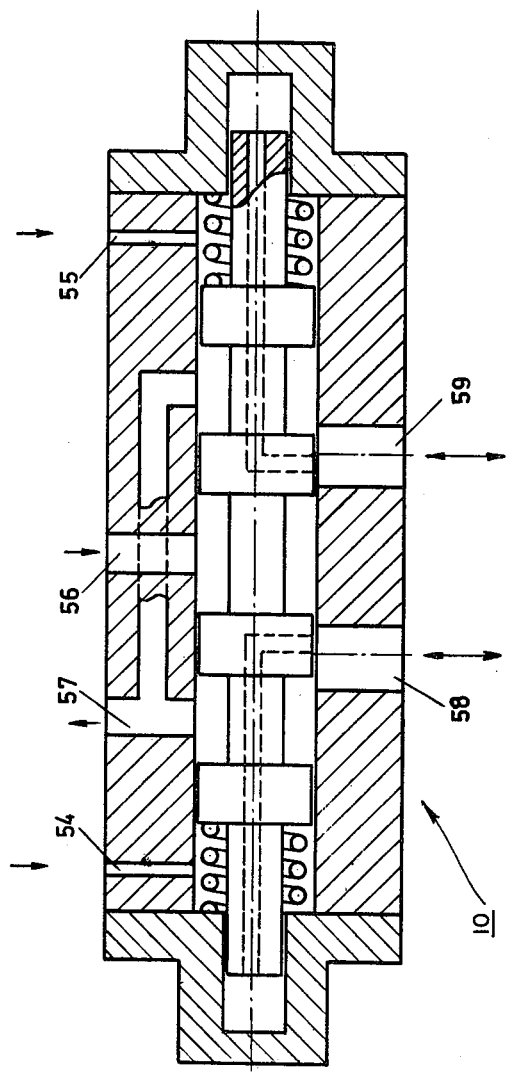
FIG. 4 in a vertical view and in cross-section shows the combined pressure and flow amplifier included in FIG. 2.

FIG. 4 shows the principle design of the combined flow and pressure amplifier 10. Input connections from the electrohydraulic converter 9 are shown by 54 and 55. The input opening from the low pressure system is designated 56, and the connection for the return flow with 57. The connections to the setting device 6 are designated 58 and 59. The amplifier is made with a piston which is spring-loaded at both ends and which, depending on the control from the oil in the pipes 54 and 55, achieves the required amplification. The electrohydraulic converter 9 can be of a type which is known in itself, comprising torque motor, nozzle plate and throttling plate.

Figure 5:
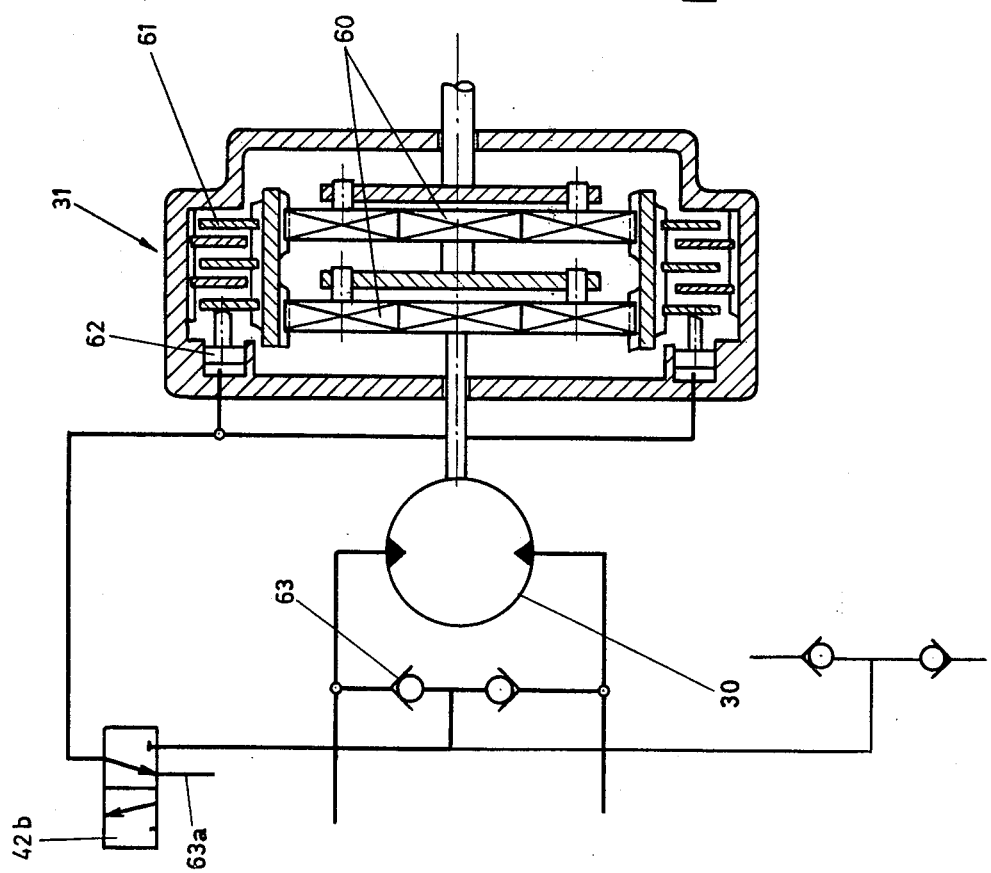
FIG. 5 in a vertical view and partly in cross-section shows the free wheeling device used by the towed vehicle for the driving wheel in question.

FIG. 5 shows the design of the wheel drive 31 utilized for the artillery piece, which includes planetary gearings 60 and a disc clutch 61. The disc clutch can be controlled by means of pistons 62 between an engaged position and a disengaged position from said planetary gearings. Said pistons 62 can be controlled from the pump pressure via non-return valves 63 and the valve 42b (cf. FIG. 2). In the actuating position of the valve, the pump pressure is fed into the pistons 62 so that the gearing and the discs coact. In the non-actuated position of the valve, the pistons 62 are instead connected to a return pipe 63a, which causes disengagement to take place.

Figure 1:
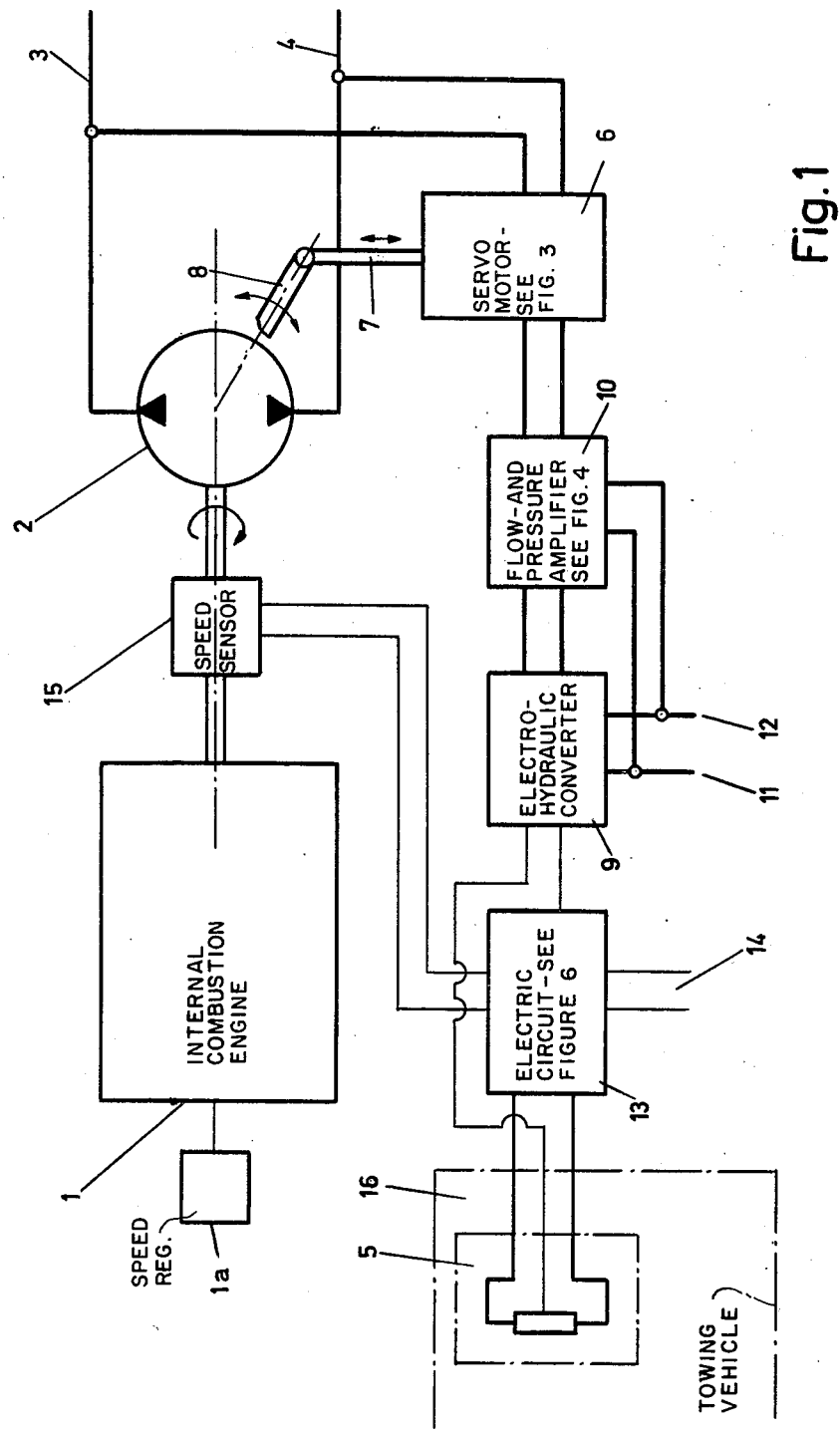
FIG. 1 in a block diagram form shows a first design of the equipment for co-ordinated driving of a field artillery piece.
Figure 6:
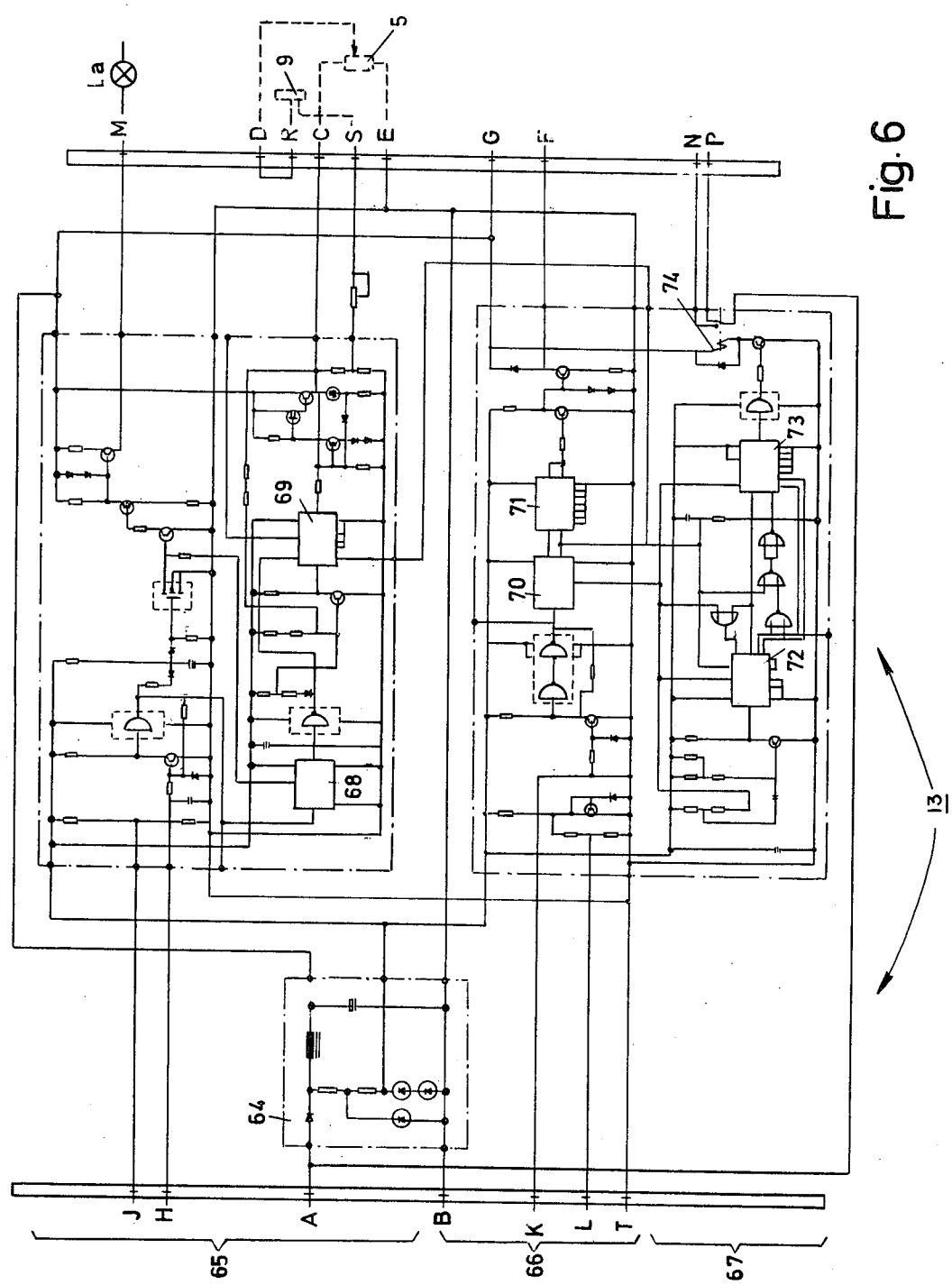
FIG. 6 in a diagram form shows the design of an electric circuit included in FIG. 1.

FIG. 6 shows the electric circuit 13 in FIG. 1. The circuit employs digital components. In the Figure, the control unit 5 and the electrohydraulic converter 9 are shown with dash lines. The connection points of the circuit are designated with letters from A to T, and current is fed by means of the connections A and B, with A connected to 24 V and B, to ground. The circuit 64 is connected to the connections A and B to provide an internal power supply which protects the circuit 13 from transients of the current feed.

The potentiometer 5 is connected to the connection points C, D and E, and the converter 9 to R and S. Via a transmitter 15 on the engine (see FIG. 1), connected to J and H, the circuit receives information about the speed of the engine. A transmitter (also not shown), at one wheel of the vehicle gives information about the speed of the vehicle and is connected to K and L.

In principle, the electric circuit has three subcircuits 65, 66 and 67, each independent of the other. The first subcircuit 65 is controlled by the transmitter on the engine. A warning lamp "La" is connected to the output connection M. This lamp flashes in pace with the engine speed. The voltage over the converter 9 is dependent linearly on the setting of the potentiometer 5 and on the voltage between the output connections C and E. Normally, the voltage between C and E is constant. If the engine speed is reduced for some reason, e.g. due to overloading, the voltage between C and E will decrease and, therewith, the voltage over the converter 9. Subcircuit 65 is built of components which are known in themselves, and comprise, among other things, a counter 68 and a so-called double D multivibrator.

The second subcircuit 66 is controlled by the speed transmitter (not shown) at one of the wheels. The outputs G and F are connected to the odometer, (not shown) of the vehicle. This subcircuit comprises, among other things, two counters 70 and 71 which, as in the case of the other components of the part circuit, are known in themselves.

The third subcircuit 67 constitutes a speed guard or governor which functions to disengage the drive of the towed vehicle as soon as the speed of the towed vehicle exceeds a predetermined rate. For instance, the speed guard can deactuate the wheel drive according to FIG. 5, and achieve free wheeling of the driving wheel. The actuation of the speed guard on the driving wheel can take place, via the valve 42b (FIG. 5). In order to be less sensitive to disturbances, the subcircuit 67 is made so that the speed of the vehicle must exceed the predetermined speed during a certain specific distance in order for a signal to be obtained on the output N or P. Subcircuit 67 is built of, among other components, a double D multivibrator 72 and a counter 73 which, like other components, are known in themselves.

Figure 7:
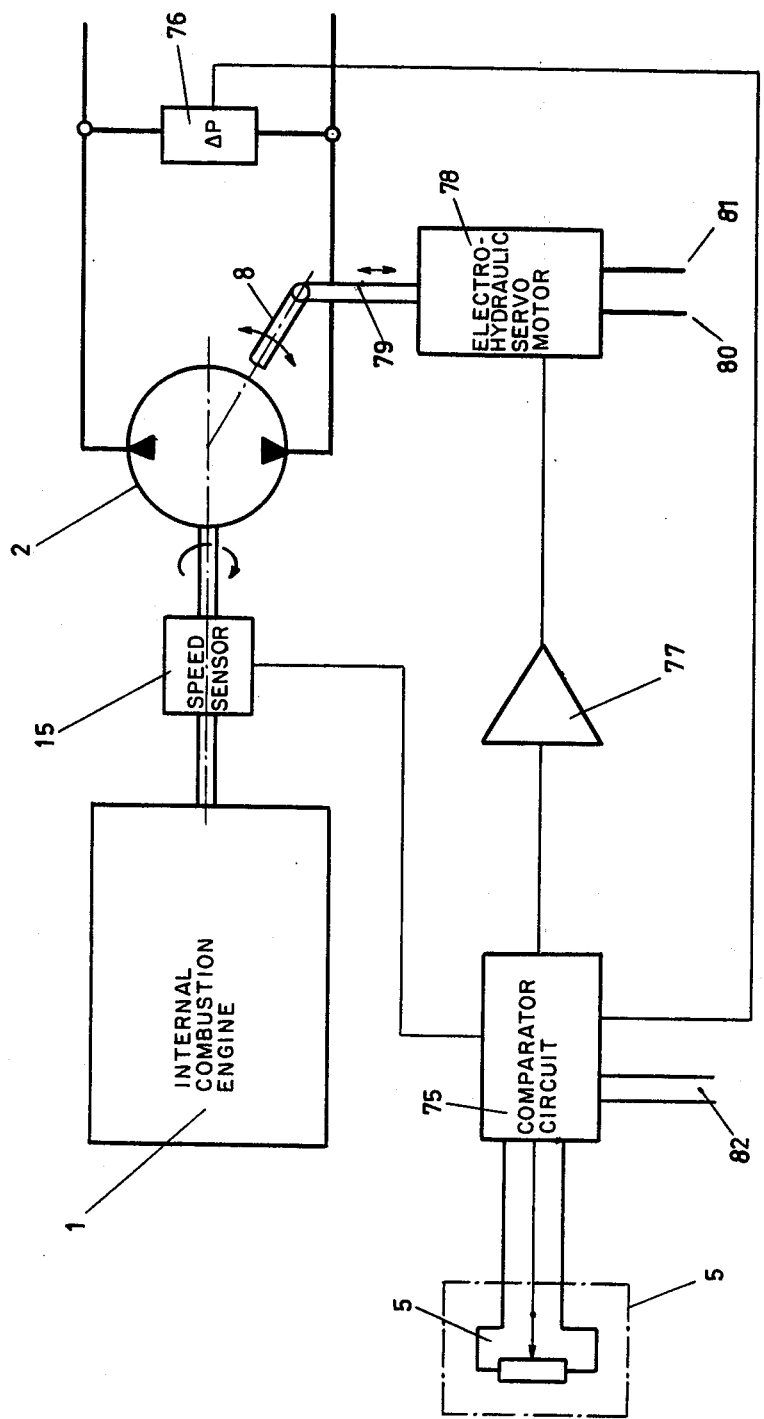
FIG. 7 in a block diagram form shows a second design of the equipment for co-ordinated driving.

In a further embodiment of the invention, the pump pressure is compared with a pilot signal generated electrically by the control unit 5, as shown schematically in FIG. 7. In this case, the comparison takes place in an electric circuit 75, to which is fed the voltage regulated by the potentiometer 5. This voltage is compared to a signal proportional to the working pressure differential which is generated by means of a pressure differential transmitter 76 connected between the two hydraulic pipes of the pump to provide a voltage signal corresponding to the pressure differential in these pipes. The electronic circuit 75 includes some form of comparator which senses the voltage from control device 5 and the voltage from the pressure transmitter 76. Via an amplifier 77 it emits a pilot voltage which is sensed by an electrohydraulic setting device or servo-motor 78. Setting device 78 has a piston 79 which actuates the pilot lever 8 of the pump. Setting device 78 also is connected to the low pressure system of the hydraulic circuit and the hydraulic tank, via pipes 80 and 81. The electronic circuit 75, the setting device 78 and its actuating devices for the pump, achieve a deflection of the pump corresponding to an actuation of the control device 5 so that the pressure emitted by the pump will be changed to the value set. Electronic circuit 75 has a power connection 82 and is connected to a speed transmitter 15 on the engine 1, so that it can reduce the working pressure the reciprocating engine 1 is overloaded.

Figure 8:
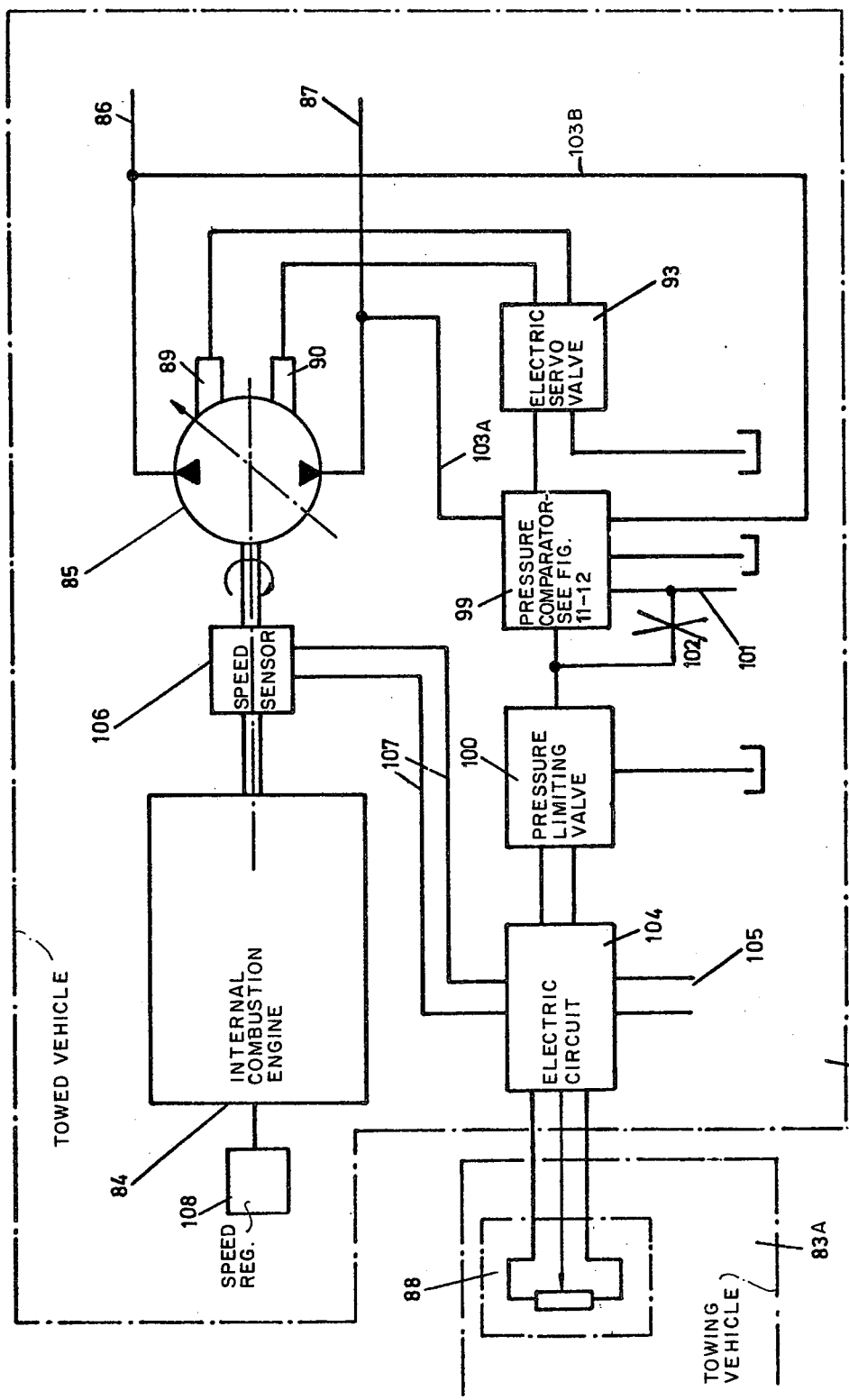
FIG. 8 in a block diagram form shows a third design of the equipment for co-ordinated driving.
Figure 9:
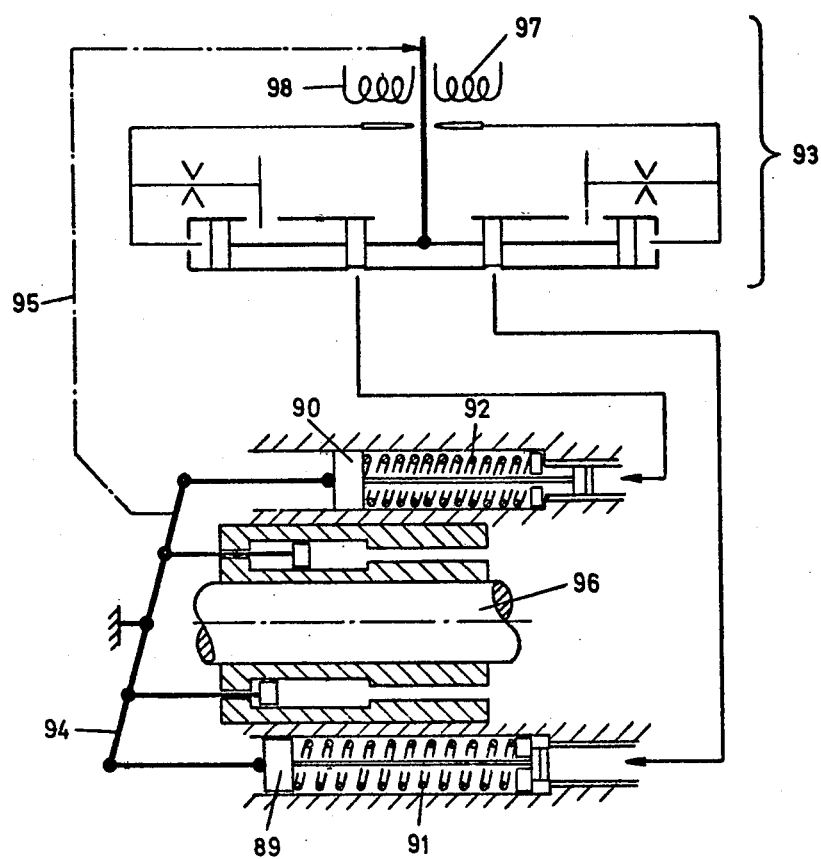
FIG. 9 shows control pistons and a servo valve for a pump included in the equipment according to FIG. 8.

A third embodiment of the invention is shown in FIGS. 8–14. In FIG. 8, the equipment for the field artillery piece is indicated within the box 83 framed by the dot-dash line. Within the box 83 a is shown the equipment arranged on the cross-country towing vehicle. The internal combustion engine 84 of the artillery piece in the form of a gasoline-driven reciprocating engine, for instance, is connected via the dividing gear box, (not shown) to a hydraulic pump 85 in a hydrostatic transmission for a hydraulic driving wheel motor (not shown). Pump 85 actuates its hydraulic motor via hydraulic pipes 86 and 87.

Depending on the load on the given driving wheel a certain working pressure differential is obtained from pump 85. The control circuit sends the working pressure that arises and adjusts the displacement of the pump and, therewith, the flow from the pump, so that the working pressure will be constant, even if the load on the driving wheel thereafter tends to change. In this way, the hydraulic motor will actuate the driving wheel with a constant torque, which is independent of, for instance, the speed of the driving wheel. Further, said torque can be regulated by means of a regulating device 88 arranged on the towing vehicle.

In the embodiment of FIG. 8, pump 85 is not of the self-priming type, and is therefore provided with a feed pump (not shown) which serves as a pressure generating member in a low pressure system. Pump 85 is of the kind which is provided with the control pistons 89, 90 shown in FIG. 9, arranged so that they can be actuated by a primary control pressure and by return springs 91, 92. At a decreasing or disappearing primary control pressure pistons 89, 90 strive to set the pump at its zero displacement position. The pump is also provided with an electrically controlled servo valve 93, which, with the equipment for co-ordinated driving disengaged is arranged to control the pressure acting on control pistons 89, 90 in response to electric control signal. Servo valve 93 is also actuated in response to movement of the thrust plate or tilting box 94 of the pump, via a mechanical feedback link symbolized by a dot-dash line 95, and arranged to feedback an indication of the degree of deflection of the pump. The equipment according to FIG. 9, which is known in itself, also comprises the shaft 96 of the pump and the control windings 97 and 98 for valve 93. The servo valve 93 normally is disengaged when the equipment for co-ordinated driving is engaged and is actuated to either of its two fully deflected positions by means of the windings 97 or 98.

In the embodiment of FIG. 8, primary control pressure for the pump is determined by a comparator 99 which sets the primary control pressure by means of a comparison of the working pressure of the pump 85 and a secondary control pressure. Primary control pressure is also influenced by the displacement reducing function of the return springs 91 and 92 at the control pistons 89 and 90 of the pump. The secondary control pressure is generated by means of an electrically controlled pressure limiting valve 100. The flow for the secondary control pressure is obtained by a connection pipe 101 from the low pressure system and a throttle 102. The comparator 99 senses the working pressure via a pipes 103 and 103B and actuates the control pistons 89 and 90 via the servo valve 93, which is completely deflected in the co-ordinated driving case.

The pressure limiting valve 100 receives its electrical control from the control unit 88 on the towing vehicle via an electronic circuit 104, which is fed with current via the feed cable 105, and is connected to a speed sensor 106 via the cable 107. The internal combustion engine 84 is also provided with a speed regulator 108, and in the example of the embodiment, said control unit 88 has been given the form of a potentiometer.

Figure 10:
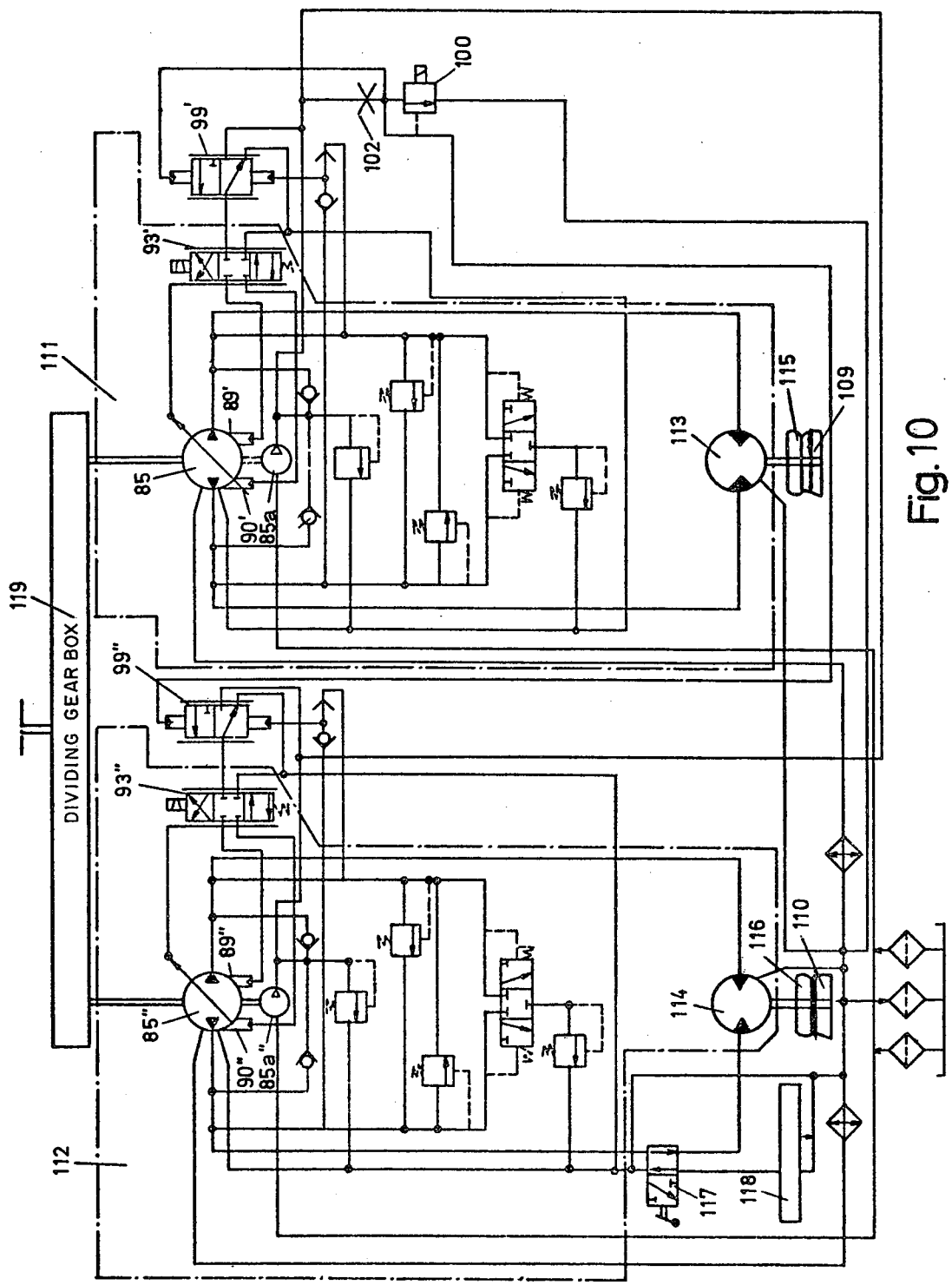
FIG. 10 in the form of a skeleton diagram shows the design of the parts of the equipment according to FIG. 8 in more detail.

FIG. 10 shows a detailed skeleton diagram of the hydrostatic transmissions and their auxiliary equipment for the embodiment according to FIG. 8. The two driving wheels 109 and 110 of the artillery piece each have a hydrostatic transmission of the type shown in FIG. 2 enclosed in boxes 111 and 112, respectively. The box 111 shows the hydrostatic transmission for the left driving wheel 100; and the box 112, the transmission for the right driving wheel 110. The components in the hydrostatic transmissions which have corresponding components in FIG. 10 have been given the same reference designations as those referring to the corresponding components in FIG. 8, but the components for the hydrostatic transmission for the left driving wheel have been supplemented with prime signs, and the components for the hydrostatic transmission of the right driving wheel have been supplemented with double prime signs. Moreover, the hydraulic motor for the left driving wheel has been designated 113, and the hydraulic motor for the right driving wheel 114.

The driving wheels 109 and 110 have each been connected to its hydraulic motor, via a free wheeling device 115 and 116, respectively, arranged to achieve automatic disengaging of the driving wheel from the hydraulic motor as soon as the towed vehicle obtains a certain predetermined speed. In addition to servo valve 93', 93" the hydrostatic transmission is provided with different valve functions and connected to a filter and a cooler, known in themselves. Thy hydraulic transmissions include pressure comparators 99', 99", respectively, and the two comparators thereby obtained single pressure limiting valve 100.

FIG. 10 also shows a manual change-over switch 117 via which the power generating equipment can be switched over for driving of other functions of the gun, such as firing, aiming etc., which functions have been symbolized by a square 118. In FIG. 10, the dividing gear box driven by the internal combustion engine is designated 119, and comprises output shafts for the pumps 85' and 85", the feed pumps for which have been designated 85a' and 85a", respectively.

Figure 11:
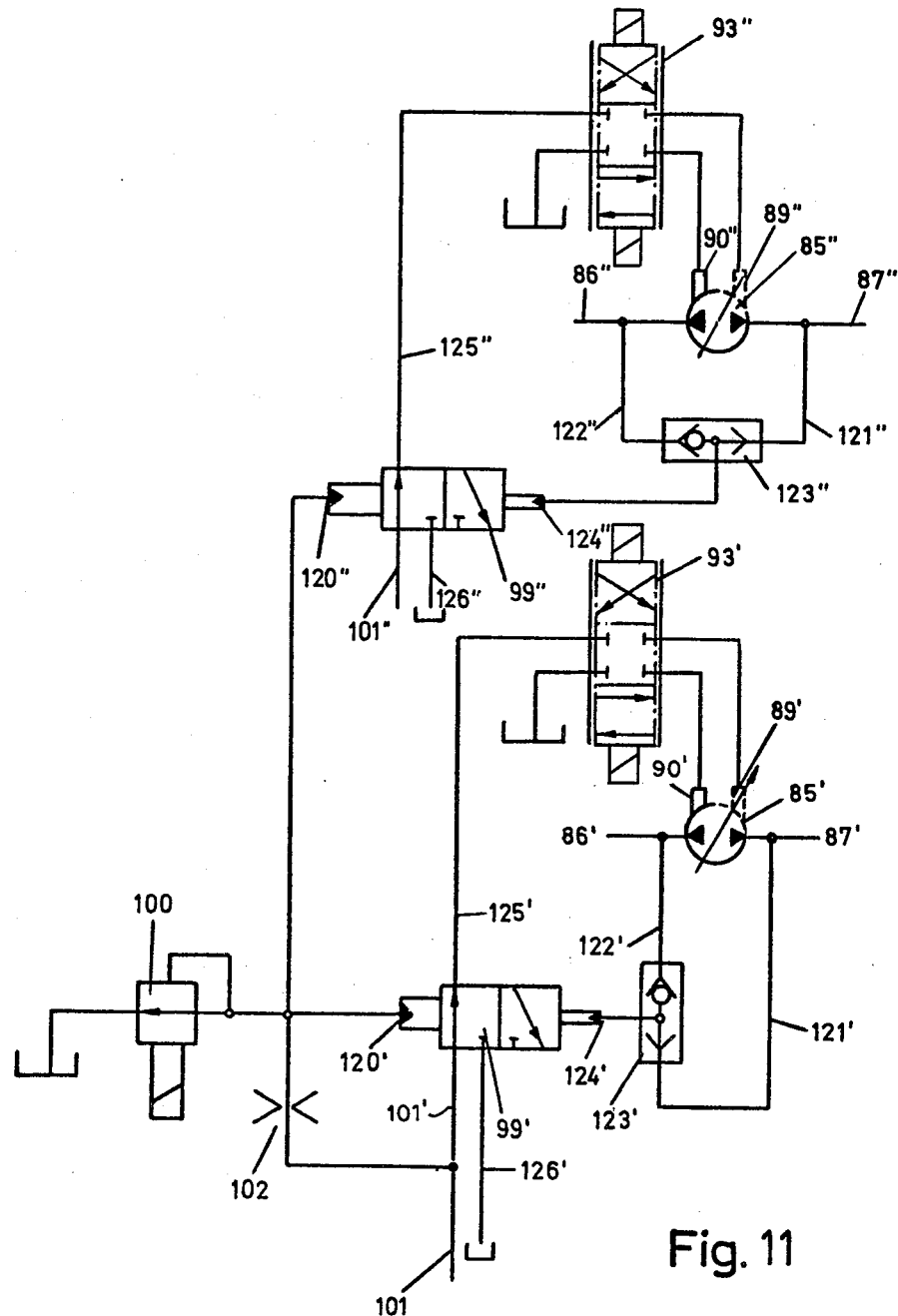
FIG. 11 in the form of a skeleton diagram shows parts of hydraulic components belonging to the equipment according to FIGS. 8 and 10.

FIG. 11 shows the function of the hydraulic part of the control system in the embodiment of FIG. 8. The reference designations correspond to those used in FIG. 8, 9 and 10, supplemented with prime signs for the left part and with double prime signs for the right part of the equipment. Via the throttle 102 and the input pipe 101, oil is fed from the low pressure system to the low level inputs 120' and 120" of the pressure comparators 99' and 99". The pressure on the low level inputs in controlled with the electrically operated pressure limiting valve 100 which is opened and closed as necessary to control pressure in line 101. The secondary control pressure regulated in this way constitutes the target value of the system. The output pipes 86', 87' and 86", 87" of the main pumps 85', 85" are connected via pipes 121', 122' and 121", 122", respectively, and a switching valve 123' and 123", respectively, to the high level inputs 124', 124" of the pressure comparators. With the aid of the respective switching valve 123', 123", the one of the two pipes 86', 87' and 86", 87", respectively, having the highest pressure, which corresponds to the working pressure of the respective main pump, is connected. This latter pressure constitutes the actual value of the system. In the respective pressure comparator, the actual value and the target value are compared. When the actual value is lower than the target value, due consideration for hydrostatic effects oil from the low pressure system can be fed to the respective servo valve 93', 93" via the pipe 101, the pressure comparator and the input pipes 125' 125", respectively, to form the primary control pressure. When said actual value is equal to the target value, the pressure comparator closes the connection between the pipe 101 and the servo valve 93' or 93", respectively. When the actual valve is greater than the target value, the feed pipes 125' and 125" of the servo valve 93' and 93", respectively, are drained via the return pipes 126' and 126", respectively.

In accordance with the above, during coordinated driving of the towing vehicle and the artillery piece, the servo valve 93', 93", respectively, is deflected, and the direction of deflection is dependent on whether the artillery piece is driven forward or in the reverse direction. The primary flow to the control pistons 89', 90' and 89", 90" of the main pump 85' and 85", respectively, will thereby be controlled by the pressure comparator 99' and 99", respectively. If the actual value is too low, the main pump will thus be deflected so that its displacement will be so great that the actual value reaches the target value. The system will thus strive to maintain the working pressure from the main pump 85' and 85", respectively, and, accordingly, the torque of the driving wheels of the gun at a value that is proportional to a pressure set with the aid of the pressure limiting valve 100.

Figure 12:
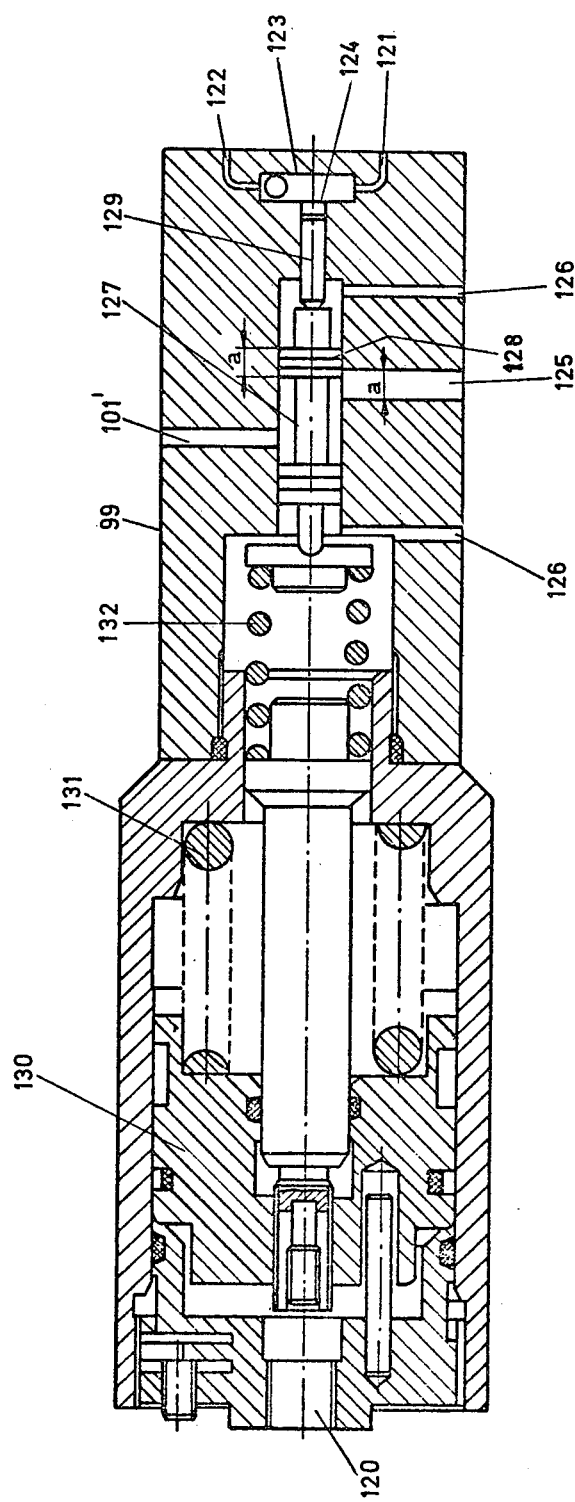
FIG. 12 in cross-section shows the design of the pressure comparator included in the equipment according to FIG. 8.

FIG. 12 shows the design, in detail, of the pressure comparator 99, which comprises a low level input 120, high level input 124, and a switching valve 123. The connections to the main pump are designated 121 and 122. The channel 101' can be connected to the pipe 101, and the channel to the input pipe to the servo valve is shown by 125. The comparator is also made with drain channels 126, for connection to the sump of the system. The pressure comparator comprises a valve spool 127 having control pistons 128 made with breaking edges, the piston height *a* of which is equal to the diameter of the channel 125.

The pressure comparator 99 has a first pilot piston 129, which is actuated by the working pressure of the main pump. Pilot piston is in contact with one end of spool 127. The pressure acting upon pilot piston 129 owing to said working pressure is balanced in the neutral position by the piston force from a second pilot piston 130, which is actuated by the pressure set by means of the pressure limiting valve 100, i.e. the target pressure. Piston 130 acts upon the other end of the spool 127 via biasing springs 131 and 132, which are arranged and dimensioned to give an appropriate characteristic to the relation valve flow/difference pressure.

Figure 13:
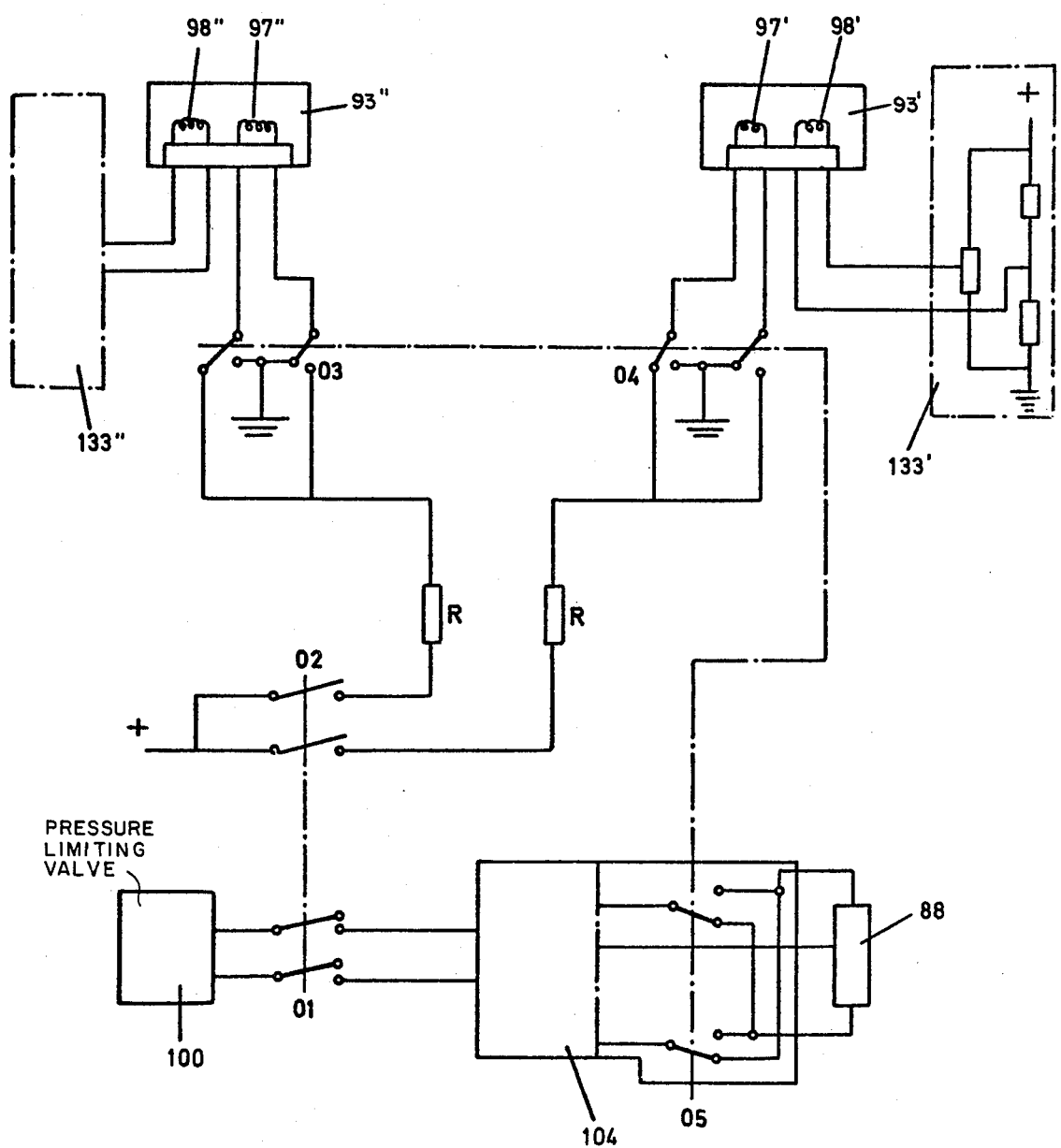
FIG. 13 in the form of a diagram shows the switching functions for the equipment in FIG. 8.

FIG. 13 shows electric circuit 104 for connection between the equipment for co-ordinated driving and the equipment for self-propulsion. For connection and disconnection, there are two interconnected change-over switches 01 and 02. With change-over switch 01, the electronic circuit 104 can be energized to actuate control device 88 which is connected to the electrically controlled pressure limiting valve 100. Thus the target pressure on the valve 100 can be set with the control unit 88, for instance depending on the engine speed. With the other change-over switch 02, the electric circuits for one of the windings 97', 97'' are activated in the electrically controlled servo valves 93', 93'' of the pumps, so that the servo valves are set at their fully deflected positions, as described above. The respective electric circuit for said windings is formed via, among other things, the plus potential of a source of power, the change-over switch 02 and a resistor R.

In accordance with FIG. 13, the electric circuits for the windings also include the change-over switches 03 and 04 for determining the directions of deflection of the servo valves, i.e. the directions of flow through the pumps and, hence, the direction of rotation of the driven wheels. When the respective change-over switches 03 and 04 are in the position shown in FIG. 13, current flows through the windings 97', 97'' in one direction, while the flow of current will be the opposite when the change-over switches 03 and 04 are in the other position. The change-over switches are provided with two contacts, via which the plus potential and ground potential can be connected alternatingly to the two sides of the windings, so that alternation of the directions of the current is obtained. The change-over switches 03 and 04 are ganged together with a change-over switch 05 included in the electronic circuit 104. With the change-over switches 03 and 05 it is thus determined whether the gun is to be driven in the forward or reverse direction. The change-over switches 01 and 02 as well as 03–05 can also respectively be connected together so that 01 and 02 together are included in one change-over switch and 03–05 in another change-over switch.

When the change-over switches 01 and 02 are unactivated, i.e. When they are in the position shown in the Figure, the servo valves 93', 93'', respectively are actuated in their normal function via the second winding 98', 98'' which is connected to control devices 133', 133'' which are used for the socalled self-propulsion of the gun. Each servo valve 93', 93'' has its control device 133', 133'' in order to make it possible to control the two driving wheels of the artillery piece individually. The respective control device 133', 133'' includes a potentiometer for controlling the current through the winding 98''.

Figure 14:
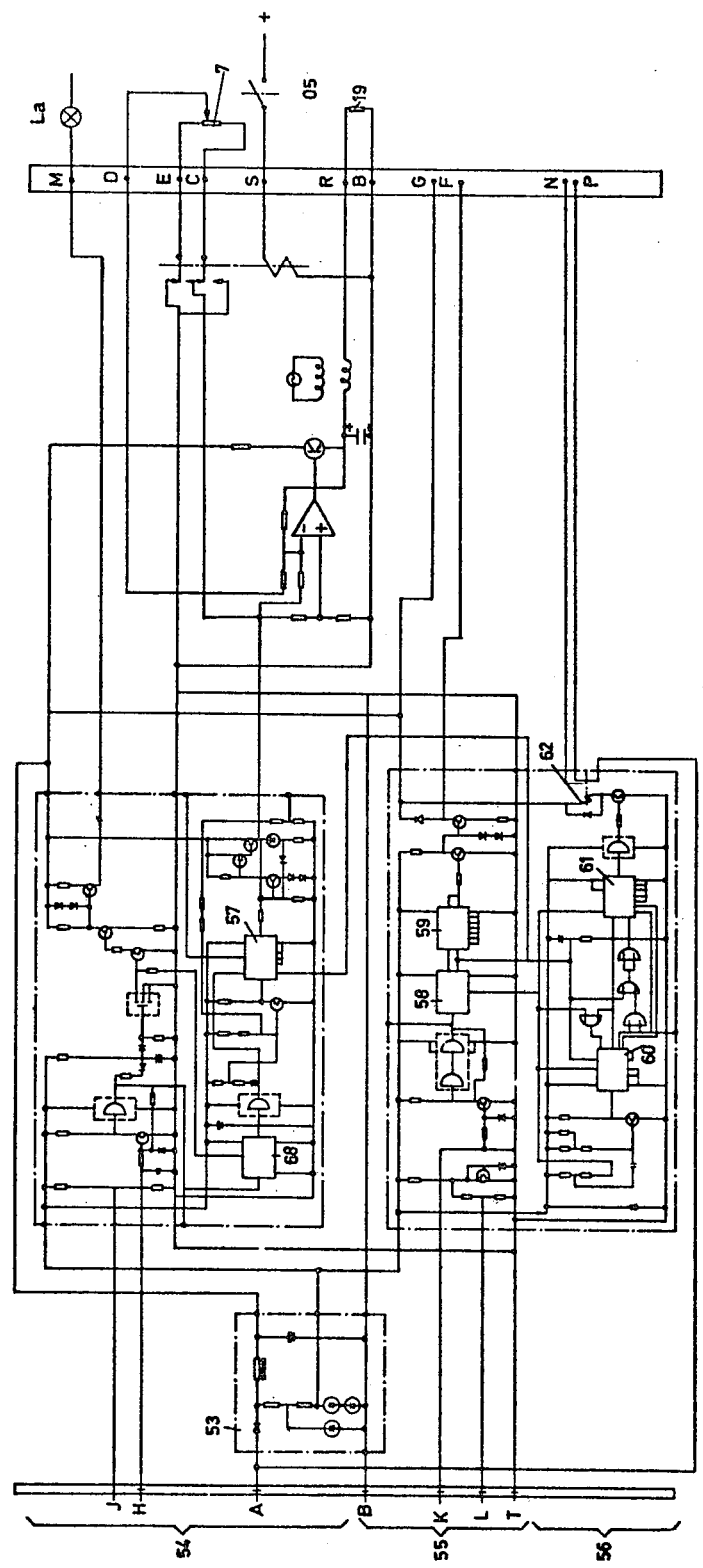
FIG. 14 in the form of a diagram in more detail shows the design of the equipment according to FIG. 6, but adapted to the design according to FIG. 8.

FIG. 14 shows how the electronic circuit 13 according to FIG. 6 is adapted to form circuit 104 for the equipment according to FIGS. 8–13. As the circuit 104, in all essential respects conforms to the circuit 13 according to FIG. 6, it will not be described in detail here.

The invention is not limited to the embodiment shown above as an example, but can be subject to modifications within the scope of the following claims.

I claim:

1. Apparatus for controlling the torque applied to each driven wheel of a towed vehicle of a towing and towed vehicle combination, comprising:
    a variable displacement hydraulic pump;
    hydraulic motor means associated with each driven wheel, said hydraulic motor means being driven by the output of said variable displacement hydraulic pump; and further being selectively engageable with said driven wheel; and
    means selectively operable from said towing vehicle for controlling the displacement of said variable displacement hydraulic pump to maintain thereby a preselected driving torque delivered by said hydraulic motor means to said driven wheel, independent of the speed of said driven wheel.

2. Apparatus according to claim 1, wherein said means for controlling the displacement of said variable displacement hydraulic pump comprises means for producing a control pressure differential signal proportional to the desired driving torque and servo-motor means responsive to said pressure differential signal and to the system pressure differential generated by said variable displacement hydraulic pump for adjusting the displacement of said variable displacement hydraulic pump.

3. Apparatus according to claim 2, wherein said variable displacement hydraulic pump includes fluid pressure piston means for changing its displacement, further comprising
    pump servo-valve means for controlling fluid flow to said fluid pressure piston means, said pump servo-valve means being operatively connected to said servo motor means for actuation thereby.

4. Apparatus according to claim 2, wherein said servomotor means includes an override member for adjusting the displacement of said variable displacement hydraulic pump in the absence of said control pressure differential, to permit self-propulsion of said towed vehicle.

5. Apparatus according to claim 3, wherein said servomotor means includes an override member for adjusting the displacement of said variable displacement hydraulic pump in the absence of said control pressure differential, to permit self-propulsion of said towed vehicle.

6. Apparatus according to claim 4, wherein said servomotor means comprises a double acting piston having springs set on either side thereof for returning said piston to a zero position in the absence of said control pressure differential and said system pressure differential.

7. Apparatus according to claim 5, wherein said servomotor means comprises a double acting piston having springs set on either side thereof for returning said piston to a zero position in the absence of said control pressure differential and said system pressure differential.

8. Apparatus according to claim 2, wherein said means for producing a control pressure differential comprises electrical means operable from said towing vehicle for generating a signal proportional to said desired driving torque; electrohydraulic converter means for producing a fluid pressure differential proportional to said signal; and, flow and pressure amplifier means responsive to said fluid pressure differential for amplifying said fluid pressure differential by a predetermined factor to produce said control pressure differential.

9. Apparatus according to claim 3, wherein said means for producing a control pressure differential comprises electrical means operable from said towing vehicle for generating a signal proportional to said desired driving torque; electrohydraulic converter means for producing a fluid pressure differential proportional to said signal; and, flow and pressure amplifier means responsive to said fluid pressure differential for amplifying said fluid pressure differential by a predetermined factor to produce said control pressure differential.

10. Apparatus according to claim 4, wherein said means for producing a control pressure differential comprises electrical means operable from said towing vehicle for generating a signal proportional to said desired driving torque; electrohydraulic converter means for producing a fluid pressure differential proportional to said signal; and, flow and pressure amplifier means responsive to said fluid pressure differential for amplifying said fluid pressure differential by a predetermined factor to produce said control pressure differential.

11. Apparatus according to claim 5, wherein said means for producing a control pressure differential comprises electrical means operable from said towing vehicle for generating a signal proportional to said desired driving torque; electrohydraulic converter means for producing a fluid pressure differential proportional to said signal; and, flow and pressure amplifier means responsive to said fluid pressure differential for amplifying said fluid pressure differential by a predetermined factor to produce said control pressure differential.

12. Apparatus according to claim 6, wherein said means for producing a control pressure differential comprises electrical means operable from said towing vehicle for generating a signal proportional to said desired driving torque; electrohydraulic converter means for producing a fluid pressure differential proportional to said signal; and, flow and pressure amplifier means responsive to said fluid pressure differential for amplifying said fluid pressure differential by a predetermined factor to produce said control pressure differential.

13. Apparatus according to claim 7, wherein said means for producing a control pressure differential comprises electrical means operable from said towing vehicle for generating a signal proportional to said desired driving torque; electrohydraulic converter means for producing a fluid pressure differential proportional to said signal; and, flow and pressure amplifier means responsive to said fluid pressure differential for amplifying said fluid pressure differential by a predetermined factor to produce said control pressure differential.

14. Apparatus according to claim 2, wherein said variable displacement hydraulic pump is driven by an internal combustion engine, further comprising speed sensing means for producing a control signal proportional to the speed of said engine, said means for controlling the displacement of said variable displacement hydraulic pump being responsive to said control signal for reducing said control pressure differential and said torque when the speed of said engine decreases due to overload or the like.

15. Apparatus according to claim 3, wherein said variable displacement hydraulic pump is driven by an internal combustion engine, further comprising speed sensing means for producing a control signal proportional to the speed of said engine, said means for controlling the displacement of said variable displacement hydraulic pump being responsive to said control signal for reducing said control pressure differential and said torque when the speed of said engine decreases due to overload or the like.

16. Apparatus according to claim 4, wherein said variable displacement hydraulic pump is driven by an internal combustion engine, further comprising speed sensing means for producing a control signal proportional to the speed of said engine, said means for controlling the displacement of said variable displacement hydraulic pump being responsive to said control signal for reducing said control pressure differential and said torque when the speed of said engine decreases due to overload or the like.

17. Apparatus according to claim 5, wherein said variable displacement hydraulic pump is driven by an internal combustion engine, further comprising speed sensing means for producing a control signal proportional to the speed of said engine, said means for controlling the displacement of said variable displacement hydraulic pump being responsive to said control signal for reducing said control pressure differential and said torque when the speed of said engine decreases due to overload or the like.

18. Apparatus according to claim 6, wherein said variable displacement hydraulic pump is driven by an internal combustion engine, further comprising speed sensing means for producing a control signal proportional to the speed of said engine, said means for controlling the displacement of said variable displacement hydraulic pump being responsive to said control signal for reducing said control pressure differential and said torque when the speed of said engine decreases due to overload or the like.

19. Apparatus according to claim 7, wherein said variable displacement hydraulic pump is driven by an internal combustion engine, further comprising speed sensing means for producing a control signal proportional to the speed of said engine, said means for controlling the displacement of said variable displacement hydraulic pump being responsive to said control signal for reducing said control pressure differential and said torque when the speed of said engine decreases due to overload or the like.

20. Apparatus according to claim 14, further comprising flashing lamp means responsive to said control signal for indicating visually the speed of said engine.

21. Apparatus according to claim 1, wherein said hydraulic motor means is connected to said driven wheel via a clutch, further comprising means for disengaging said clutch to permit free wheeling of said driven wheel above a preselected speed of said vehicle combination.

22. Apparatus according to claim 1, wherein said means for controlling the displacement of said variable displacement hydraulic pump comprises means for generating a first signal proportional to a desired system pressure differential to be produced by said variable displacement hydraulic pump; means for generating a second signal proportional to the actual system pressure differential produced by said variable displacement hydraulic pump; and, means responsive to said first and second signals for adjusting the displacement of said variable displacement hydraulic pump.

23. Apparatus according to claim 22, wherein said means responsive to said first and second signals comprises comparator means for producing a control signal and electro-hydraulic servo-motor means for adjusting the displacement of said variable displacement hydraulic pump in response to said control signal.

24. Apparatus according to claim 22, wherein said variable displacement hydraulic pump is driven by an internal combustion engine, further comprising speed sensing means for producing a control signal proportional to the speed of said engine, said means responsive to said first and second signals being responsive as well to said control signal for adjusting said displacement to reduce said torque when the speed of said engine decreases due to overload or the like.

25. Apparatus according to claim 1, wherein said variable displacement hydraulic pump includes fluid pressure piston means for changing its displacement, said piston means being spring biased to return said variable displacement hydraulic pump to its zero displacement configuration in the absence of actuating fluid pressure; and, said means for controlling the displacement of said variable displacement hydraulic pump comprises means for producing a target pressure for said variable displacement hydraulic pump, means for comparing said target pressure and the actual pressure of said variable displacement hydraulic pump and producing a control pressure for said pressure piston means to adjust the displacement of said variable displacement hydraulic pump.

26. Apparatus according to claim 25, wherein said means for producing a target pressure comprises a source of pressurized fluid and a pressure limiting valve for controlling the pressure of fluid from said source to said means for comparing.

27. Apparatus according to claim 25, further comprising servo-valve means located between said means for comparing and said pressure piston means for controlling the direction of flow to said pressure piston means; and, means for actuating said servo valve means to control the direction of flow through said variable displacement hydraulic pump and, hence, movement of said vehicle combination.

28. Apparatus according to claim 26, wherein said source of pressurized fluid comprises a low pressure feed pump connected to said pressure limiting valve via a throttle.

29. Apparatus according to claim 27, wherein said servo-valve means includes first and second electric windings for its actuation and said means for actuating said servo-valve means controls the direction of current flow through said first electric winding to control the direction of said flow, further comprising means located on said towed vehicle for controlling independently the direction of flow through said second electric winding to permit self-propulsion of said towed vehicle.

30. Apparatus according to claim 45 wherein said pressure limiting valve is electrically controlled.

31. Apparatus according to claim 25, wherein said means for comparing comprises a valve spool with plunger pistons for controlling flow to said fluid pressure piston means; a first pilot piston responsive to said actual pressure of said variable displacement hydraulic pump, said first pilot piston being operatively associated with one end of said valve spool to bias it in a first direction; a second pilot piston responsive to said target pressure, said second pilot piston being operatively associated with the other end of said valve spool to bias it in an opposite direction.

32. Apparatus according to claim 26, wherein there are separate variable displacement hydraulic pumps, hydraulic motors and means for comparing for each driven wheel, there being a common pressure limiting valve for all means for comparing.

* * * * *